United States Patent [19]

Imamura et al.

[11] Patent Number: 4,457,945
[45] Date of Patent: Jul. 3, 1984

[54] MUSHROOM GROWING BY UTILIZING SEWAGE SLUDGE COMPOST AND RE-UTILIZATION OF THE USED COMPOST AS LIVESTOCK FEED

[75] Inventors: Yoshinobu Imamura; Hajime Ito; Yoko Sato; Hiromichi Nakamori, all of Amagasaki, Japan

[73] Assignee: Hitachi Kiden Kogyo, Ltd., Hyogo, Japan

[21] Appl. No.: 421,582

[22] Filed: Sep. 22, 1982

[30] Foreign Application Priority Data

Mar. 15, 1982 [JP] Japan ................................ 57-41510

[51] Int. Cl.³ .............................................. A23B 7/10
[52] U.S. Cl. ........................................ 426/53; 426/54; 426/807; 71/5; 47/1.1
[58] Field of Search .................. 71/5, 9, 12; 426/807, 426/53, 54, 58, 60; 47/1.1

[56] References Cited

U.S. PATENT DOCUMENTS

| | | | |
|---|---|---|---|
| 3,829,363 | 8/1974 | Rogers et al. | 426/807 X |
| 4,127,965 | 12/1978 | Mee | 71/5 |
| 4,339,265 | 7/1982 | Engelmann | 71/9 |

FOREIGN PATENT DOCUMENTS

| | | | |
|---|---|---|---|
| 53-149577 | 12/1978 | Japan | 426/53 |
| 54-10174 | 1/1979 | Japan | 426/53 |
| 1502238 | 2/1978 | United Kingdom | 71/5 |

Primary Examiner—Ferris H. Lander
Attorney, Agent, or Firm—Wenderoth, Lind & Ponack

[57] ABSTRACT

A method of utilizing sewage sludge compost for mushroom growing and re-utilizing the used compost as livestock feed. During the use of compost for mushroom growing, lignin, cellulose, etc. of slight decomposability contained in the compost are decomposed and aroma suitable for livestock feed is imparted to the compost by the mushroom, thereby making the compost most suitable for livestock feed.

2 Claims, 1 Drawing Figure

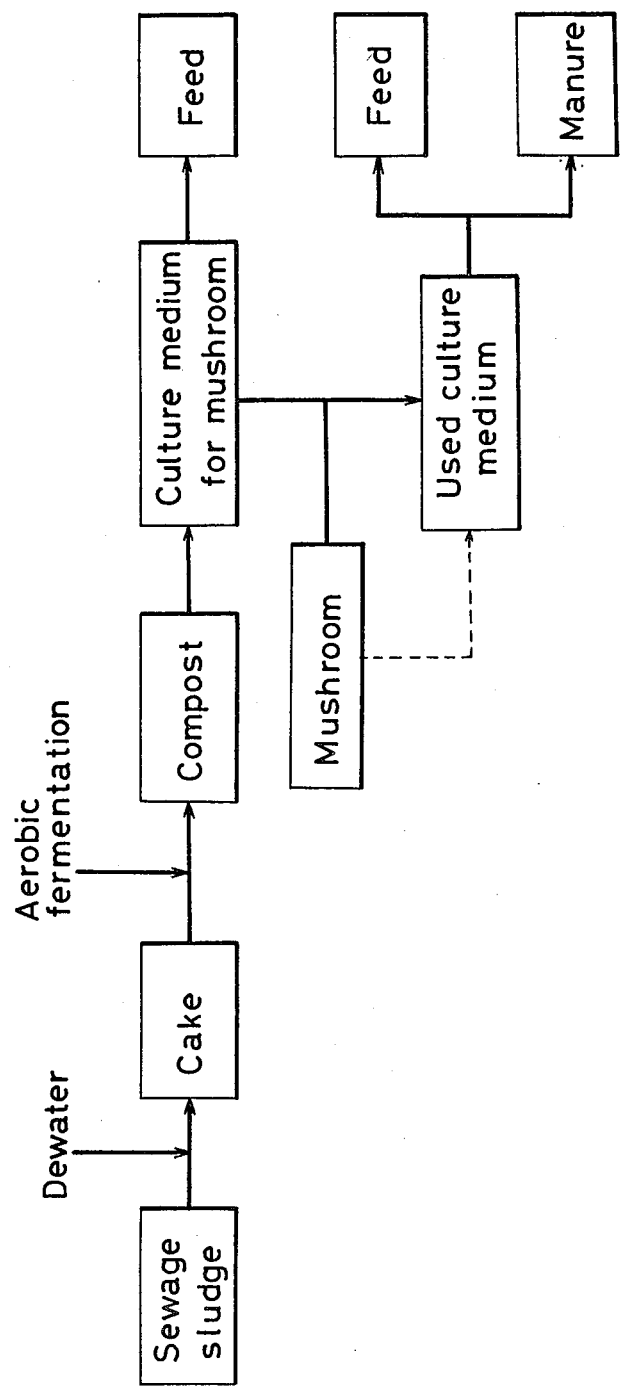

MUSHROOM GROWING BY UTILIZING SEWAGE SLUDGE COMPOST AND RE-UTILIZATION OF THE USED COMPOST AS LIVESTOCK FEED

This invention relates to the method of making sewage sludge into compost for mushroom growing and re-utilizing the used compost as livestock feed.

Generally, sewage sludge collected at the sewage treatment is made into cakes of the specific percentage of moisture content by dewatering it, with addition of additives if necessary, and the dewatered cakes are further made into compost by aerobic fermentation. The compost thus produced is applied to the cropland as manure. Besides, it is a fact that Japan depends upon importation for more than half of the total required quantity of livestock feed, including crude feed and concentrated feed.

The present invention has for its object to make sewage sludge collected at the sewage treatment into compost and reuse it as livestock feed; however the conventional compost containing much lignin, cellulose, etc., which are slightly decomposable, is low in nutritive value and is not suitable for livestock feed. In view of such demerits of the conventional compost, the present invention provides the method of producing compost by aerobically fermenting sewage sludge for use as a culture medium for mushroom growing after destroying germs and also re-utilizing such compost, after it was used for mushroom growing, as manure or as livestock feed having a high nutritive value and a good taste for livestock.

The attached drawing is a diagram showing a mushroom growing procedure by utilizing sewage sludge compost and re-utilization of the used compost as livestock feed or manure. The organic substance portion of sewage sludge comprises about 35% sulphuric acid soluble part (mainly cellulose), about 10% lipid, about 10% lignin and some nitrogen, phosphor, etc. Contents of these elements vary with kinds of sludge and T-N (total nitrogen) is within the range of 1–6% and $P_2O_5$ is within the range of 1–5%, from which it can be said that nutritively, sewage sludge contains elements which can be utilized as manure and livestock feed. This is proved by the following table showing an example of the analysis of elements of sewage sludge as crude feed.

| Element | Composition (dry weight - %) | |
|---|---|---|
| | Raw sludge | Digested sludge |
| Crude protein | 19.4 | 12.5 |
| Oil and fat | 25.2 | 6.9 |
| Crude fiber | 10.8 | 9.8 |
| Total of organic substances | 69.9 | 39.5 |

Crude protein = Nitrogen × 6.25

However, dewatered cakes made from sludge show a high percentage of water content (70–85%) and contain easily-decomposable substances. Therefore, dewatered cakes can cause anaerobic fermentation and raise serious problems in the aspect of handling and hygiene. Also, they are bad in taste which is an important factor for livestock feed. Therefore, for the purpose of aerobic fermentation of sewage sludge collected from a sewage treatment plant or the like, various additives are added to the sewage sludge, such as rice hulls, sawdust, bark, etc., for adjusting the percentage of water content and then aerobic fermentation of the sewage sludge is effected for producing the sewage sludge compost. By producing compost at the above way, sewage sludge is stabilized as manure and can be returned to the farmland in a reduced weight. However, use of such compost as livestock feed causes various troubles, even though the problems of handling and hygiene are solved. That is, decomposition of the sludge progresses by aerobic fermentation and easily-decomposable saccharide and fungous protein are decomposed quickly, but cellulose and lignin contained in additives which are indigestive to livestock increase relatively, with the result that the nutritive value is decreased and little improvement is made in respect to the taste.

In the present invention, the sewage sludge compost is used as a culture medium for mushroom growing, during which indecomposable substances, such as cellulose and lignin, included in the compost are decomposed and protein is re-synthesized, thereby making the compost into good manure. The culture medium, after used for mushroom growing, is reused as livestock feed.

Agricultural waste to be utilized as additives for sewage sludge compost contains little nitrogen but much cellulose and lignin. Therefore, as compared with dewatered sludge caskes, the compost produced contains less nitrogen but more cellulose and lignin.

The following table shows an example of the elements analysis of various sewage sludge compost.

| | Compost | | |
|---|---|---|---|
| Element (%) | Rice hull compost | Sawdust compost | Bark compost |
| N | 2.1 | 2.53 | 2.09 |
| $P_2O_5$ | 1.43 | 1.25 | 1.12 |
| $K_2O$ | 0.28 | 0.09 | 0.15 |
| C | 33.2 | 40.5 | 49.4 |
| Cellulose | 32.6 | 40.2 | 19.2 |
| Lignin | 14.0 | 24.0 | 40.6 |

(Dry weight - %)

Mushroom decomposes cellulose and lignin elements contained in the compost and change them into a source of carbonic nutrition. Also, mushrooms can be grown by utilizing the microelements contained in the compost, such as metals and vitamins. The greater part of cellulose and lignin contained in the compost is decomposed by the action of cellulose, peroxidase, etc. which are secreted out of the mushroom mycelium and is deposited in mycelium as a polysaccharide, such as glycogen and trehalose. The remaining cellulose and lignin also turn into digestible form. The nitrogen contained in the compost is re-synthesized into a fungous protein and at the same time, vitamins are synthesized. Thus, the compost itself is imparted with an aroma peculiar to mushrooms and is made suitable for livestock feed. The compost, including mycelium, is suitable as a feed material of high nutritive value because it is imparted with the proteins of mushroom and mycelium and the nutritive elements of the mushrooms themselves.

The following table shows an example of the change of sewage sludge compost elements due to "shiitake" (a kind of mushroom) cultivation.

|  | Element (dry weight - %) | | | | | | |
|---|---|---|---|---|---|---|---|
| Sample | Crude protein | Crude fat | Soluble non-nitrogenous substance | Crude fiber | Crude ash | Cellulose | Lignin |
| Before "shiitake" cultivation, Sewage sludge compost (bark) + rice bran 10% | 3.8 | 4.0 | 12.2 | 62.6 | 17.4 | 26.9 | 42.1 |
| After "shiitake" cultivation, Sewage sludge compost (bark) + rice bran 10% | 4.8 | 1.4 | 48.6 | 24.5 | 20.7 | 14.0 | 14.7 |

Feed elements were measured by the crude feed analysis method. (Cellulose and lignin were measured by P. J. Van Soest method)

According to the present invention, sewage sludge which is endlessly obtainable is made into a compost for use as culture medium for mushrooms. While such compost is used for mushroom growing, lignin and cellulose which are slightly decomposable and harmful, if accumulated in large quantities in cropland, are decomposed and imparted with a tasty aroma. Thus, compost used for mushroom growing can be re-utilized as livestock feed of a high nutritive value and also as manure.

What is claimed is:

1. In a method of producing livestock feed from a material containing lignin, cellulose, hemicellulose and pentosan by the decomposing action of mushrooms, the improvement wherein the material is a compost produced from a composition consisting essentially of a mixture of sewage sludge and an additive selected from the group consisting of rice hulls, sawdust and bark, wherein said compost is produced by (a) converting sewage sludge into dewatered cakes; (b) mixing the sewage sludge with an additive selected from the group consisting essentially of rice hulls, sawdust and bark; (c) subjecting the thus-produced mixture to aerobic fermentation to convert it into compost; and (d) decomposing the lignin, cellulose, hemicellulose and pentosan in said compost with mushrooms capable of decomposing said lignin, cellulose, hemicellulose and pentosan so as to convert the compost to livestock feed high in nutritive value.

2. The improvement according to claim 1 wherein the mushrooms are Shiitake mushrooms.

* * * * *